US011280375B2

(12) United States Patent
Rößner et al.

(10) Patent No.: US 11,280,375 B2
(45) Date of Patent: Mar. 22, 2022

(54) TORSION DAMPING ASSEMBLY AND MOTOR VEHICLE

(71) Applicant: ZF FRIEDRICHSHAFEN AG, Friedrichshafen (DE)

(72) Inventors: Monika Rößner, Donnersdorf (DE); Gerald Viernekes, Hassfurt (DE); Alessio Paone, Werneck (DE); Axel Rohm, Schonungen (DE); Alexander Bartha, Würzburg (DE); Michael Kunth, Mellrichstadt (DE); Guido Schmitt, Oerlenbach (DE); Wolfgang Kundermann, Dornburg-Dorndorf (DE); Stephan Stroph, Tettnang (DE); Thomas Riedisser, Sigmarszell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/627,855

(22) PCT Filed: Jun. 6, 2018

(86) PCT No.: PCT/EP2018/064830
§ 371 (c)(1),
(2) Date: Dec. 31, 2019

(87) PCT Pub. No.: WO2019/007618
PCT Pub. Date: Jan. 10, 2019

(65) Prior Publication Data
US 2020/0232519 A1 Jul. 23, 2020

(30) Foreign Application Priority Data

Jul. 3, 2017 (DE) .................... 10 2017 211 264.6

(51) Int. Cl.
*F16D 21/00* (2006.01)
*B60K 17/02* (2006.01)
(Continued)

(52) U.S. Cl.
CPC .............. *F16D 21/00* (2013.01); *B60K 17/02* (2013.01); *F02N 5/04* (2013.01); *F02N 15/025* (2013.01);
(Continued)

(58) Field of Classification Search
CPC .......... F16D 21/00; F16D 11/14; F16D 13/24; F16D 2300/22; F16D 25/0632; F16D 13/66; F16D 13/648
See application file for complete search history.

(56) References Cited

U.S. PATENT DOCUMENTS 6,099,435 A * 8/2000 Halene ................... F16H 41/26
477/62
6,494,303 B1 * 12/2002 Reik ...................... F16H 45/02
192/3.29
(Continued)

FOREIGN PATENT DOCUMENTS

DE 4434019 A1 * 4/1995 ............. B60K 17/02
DE 10034730 8/2001
(Continued)

OTHER PUBLICATIONS

Office Action for the corresponding German Patent Application No. 10 2017 211 264.6.

*Primary Examiner* — Stacey A Fluhart
(74) *Attorney, Agent, or Firm* — Cozen O'Connor

(57) ABSTRACT

A torsional damper arrangement for a motor vehicle with a housing. The housing encloses a wet space. A momentum start clutch arrangement is arranged in the housing.

18 Claims, 3 Drawing Sheets

(51) Int. Cl.
*F02N 5/04* (2006.01)
*F02N 15/02* (2006.01)
*F16D 11/14* (2006.01)
*F16D 25/0632* (2006.01)
*F16F 15/14* (2006.01)
*F16D 13/24* (2006.01)

(52) U.S. Cl.
CPC .......... *F16D 11/14* (2013.01); *F16D 25/0632* (2013.01); *F16F 15/145* (2013.01); *F16D 13/24* (2013.01); *F16D 2300/22* (2013.01)

(56) References Cited

U.S. PATENT DOCUMENTS

| | | | | |
|---|---|---|---|---|
| 2006/0065503 | A1* | 3/2006 | Cherry | B60W 10/02 192/3.63 |
| 2009/0057088 | A1* | 3/2009 | Sakai | F16D 25/0638 192/70.12 |
| 2015/0001027 | A1* | 1/2015 | Schroder | F16D 25/123 192/66.3 |
| 2015/0021137 | A1* | 1/2015 | Lindemann | F16H 45/02 192/3.29 |
| 2016/0131239 | A1 | 5/2016 | Steinberger et al. | |
| 2016/0238116 | A1 | 8/2016 | Chen | |
| 2017/0326962 | A1* | 11/2017 | Aringsmann | F16D 13/24 |
| 2017/0328457 | A1* | 11/2017 | Vanni | F16D 25/0632 |
| 2018/0266493 | A1* | 9/2018 | Dempfle | F16D 25/0632 |
| 2018/0347639 | A1* | 12/2018 | Ishizaka | F16H 61/0265 |
| 2020/0049205 | A1* | 2/2020 | Echtler | F16D 13/36 |
| 2021/0054883 | A1* | 2/2021 | Grethel | F16D 13/683 |

FOREIGN PATENT DOCUMENTS

| | | |
|---|---|---|
| DE | 10047755 | 4/2002 |
| DE | 102009045562 | 4/2011 |
| DE | 102015201931 | 8/2016 |
| EP | 1736345 | 12/2006 |
| WO | WO 2011018436 | 2/2011 |

* cited by examiner

TORSION DAMPING ASSEMBLY AND MOTOR VEHICLE

CROSS REFERENCE TO RELATED APPLICATIONS

This is a U.S. national stage of Application No. PCT/EP2018/064830 filed Jun. 6, 2018. Priority is claimed on German Application No. DE 10 2017 211 264.6 filed Jul. 3, 2017 the content of which is incorporated herein by reference.

BACKGROUND OF THE INVENTION

1. Field of the Invention

The invention is directed to a torsional damper arrangement for a motor vehicle with a housing, which housing encloses a wet space.

2. Description of Related Art

Torsional damper arrangements, for example, dual mass flywheels, are found in the powertrain of a motor vehicle for damping torsional vibrations. These torsional damper arrangements may be combined with centrifugal pendulums. A plurality of torsional dampers can also be used in a powertrain.

A problem in hybridized powertrains is that, in electric motor operation, a torsional damper arrangement connected to the internal combustion engine must be accelerated with the internal combustion engine for starting the internal combustion engine. Accordingly, the electric motor must have a corresponding power reserve.

For this reason, it is known to provide a momentum start clutch upstream of the torsional damper arrangement so that the internal combustion engine can be uncoupled from the powertrain during electric motor operation, but the torsional damper arrangement can be utilized as flywheel mass and energy storage.

However, constructions of this kind demand extensive installation space in axial length.

SUMMARY OF THE INVENTION

It is the object of one aspect of the present invention to provide a torsional damper arrangement in which installation space can be saved in axial direction in a hybridized powertrain.

It is suggested that a momentum start clutch arrangement is arranged in the housing of the torsional damper arrangement. In other words, the torsional damper arrangement receives the momentum start clutch arrangement. In this way, for example, at least a portion of the housing of the momentum start clutch arrangement can be saved from the beginning and axial installation space can be gained in this way.

The torsional damper arrangement can preferably be constructed as a dual mass flywheel. A dual mass flywheel differs from other torsional damper arrangements particularly with respect to the ratio of the masses of the primary side and secondary side.

The momentum start clutch arrangement can advantageously have a friction clutch and a dog clutch. The friction clutch can be configured such that it can oppose only a portion of these negative torques and accordingly enables a soft flank change of the dog teeth. Alternatively, the friction clutch can advantageously be configured such that it can transmit the entire negative torque in pull direction by itself and the dog clutch can accept the remaining torque in pull direction. For example, during negative torques in pull direction of 600 Nm, the friction clutch can oppose the latter by itself or can be designed for 700 Nm, for example, so that there is a safety reserve. When the maximum torque in pull direction is around 2000 Nm, the dog clutch is configured to transmit 1400 Nm. Accordingly, in excess of 700 Nm the positive torque in pull direction is transmitted by both clutches jointly, while the negative torques can be accepted by the friction clutch by itself. In particular, rattling noises in the dog clutch can be prevented in this way.

If the friction clutch is designed for 600 N to 400 Nm or 500 Nm during negative torques, the dog clutch must accept the remaining negative torque, but rattling noises of the dog clutch must also be ruled out in this case because the dog flank change is damped by the friction clutch running in parallel.

The momentum start clutch arrangement can advantageously also have an actuation device with at least two actuation pistons. Accordingly, the momentum start clutch arrangement has a wet actuation. Since the clutch or clutches of the momentum start clutch arrangement are arranged in the wet space of the torsional damper arrangement, the clutches are also wet.

In principle, all of the actuation parts following the pressure space are understood as pistons. Accordingly, an actuation piston can be formed of multiple parts. However, it is preferably formed of one part.

Generally, the momentum start clutch arrangement comprises at least one clutch which, in principle, may be a wet or dry clutch. Two pistons are used only when at least two clutches are used. Even then, the configuration or combination of a friction clutch and a dog clutch is a preferred embodiment form, for example, a friction clutch and a freewheel or other variations are also possible.

In an advantageous manner, a dog element of a dog clutch can be formed at one of the pistons. Accordingly, one of the clutches is formed as a dog clutch. By forming the dog element at the piston, two functions can be combined in one component part so that a compact construction can be realized.

Further, a friction surface of the friction clutch can be formed at one of the pistons. In this case, the other piston is also formed as part of the clutch so that a plurality of functions are again provided at an individual component part. Accordingly, the quantity of component parts at these locations can already be reduced. This can be carried out regardless of the construction of the other piston.

The actuation device can preferably have an individual feed line. This is also the case when the momentum start clutch arrangement has a plurality of clutches. Specifically, these clutches are not to be actuated independent from one another. On the contrary, the clutches are to transmit the positive torques in pull direction jointly. Consequently, with normally open clutches the actuation engages the clutches, and with normally closed clutches the actuation releases the clutches according to a predeterminable pattern. Consequently, the pressurized surfaces of the actuation piston can have a predetermined ratio which is selected depending on at least one preloading element. With normally open clutches, preloading elements can be present for bringing the clutches into a defined initial position. This preloading force must be overcome during engagement. The preloading force can be configured differently for the individual clutches. Highly defined engagement states in which the other respective clutch is engaged can then be selected through the selection of the pressurized surfaces. For example, the friction clutch can be engaged first. When it transmits a defined torque already in slip mode, the dog clutch is also engaged. This torque can be defined in a precise manner through the selection of the pressurized surfaces. Accordingly, the dog clutch can be engaged depending on the engagement state of the friction clutch.

In this example, the friction clutch is that clutch that remains closed longer during disengagement. This is advantageous because it allows disengagement without jerkiness.

This holds true whenever the friction clutch is engaged first regardless of whether the clutches are configured as normally open clutches or normally closed clutches. With a mixed construction of the clutches, the same process can be achieved even when one clutch is actuated for engagement and the other clutch is actuated for disengagement.

A friction surface, particularly a friction cone, of the friction clutch can advantageously be formed at one of the pistons. This piston can preferably be used or arranged on the output side of the friction clutch.

A friction element, which is connected to an input hub or to the input hub, can advantageously be arranged on the input side of the friction clutch. In particular, the friction element can be a lamina. The friction clutch preferably has an individual lamina. The friction clutch is then formed as a kind of single-disk friction clutch, and the clutch disk is constructed in an extremely simple manner.

The friction surface at the piston is advantageously formed conically. Accordingly, the friction element, particularly the lamina, is also arranged to be inclined.

A portion of the housing of the torsional damper arrangement is advantageously a friction surface of the friction clutch. In particular, this portion of the housing can be located on the output side of the friction clutch and can belong to the primary side of the torsional damper arrangement of the same time.

The actuation device can advantageously have an individual feed line. In this way, it is possible for the actuation device to be charged with oil via the transmission input shaft. Accordingly, costly lines for the oil of the actuation device can be avoided.

The pistons can advantageously be supported at an intermediate wall of the torsional damper arrangement. In a further development, the oil supply can also be formed at this intermediate wall. In contrast to the usual procedure, namely, arranging the pressure space and the pistons at existing component parts of the clutch, it is advantageous in a momentum start clutch arrangement for the latter to have a larger flywheel mass. Accordingly, the additional intermediate wall is connected to the torsional damper arrangement. However, a connection to the hub, or the hubs, on the input side would only increase the weight of the momentum start clutch arrangement. However, the flywheel mass can be increased. In so doing, a greater rotational energy can be stored at the same speed.

The intermediate wall can advantageously be arranged between the primary side and the secondary side. A space-saving installation is possible at this location.

The intermediate wall can advantageously be supported at an input hub. The support can be carried out via two radial shaft sealing rings. The feed of oil into the intermediate wall can also be carried out at this location.

The intermediate wall can have at least one through-opening for oil. Cooling oil can then be routed to the clutches. The at least one through-opening is preferably arranged radially outside of the clutch, or clutches, of the momentum start clutch arrangement. Oil is then guided to the openings through the existing centrifugal forces.

The pistons can be arranged on the same side of the torsional damper arrangement, particularly on the same side of the intermediate wall. The engagement movement can be carried out toward the housing or toward the inside of the torsional damper arrangement. A movement toward the housing is preferred. This results in a construction that is extremely sparing of installation space.

Alternatively, the pistons can be arranged on different sides of the intermediate wall. In this construction, it is possible to form the input hub from two parts so that the friction clutch and the dog clutch can be uncoupled. This is also possible in an economical manner when the two pistons are arranged on the same side.

As described, the intermediate wall is preferably connected to the primary side of the torsional damper arrangement. It is further preferable to arrange the momentum start clutch arrangement preferably between the primary side and the secondary side of the torsional damper arrangement. The primary side of the torsional damper arrangement can form a part of the housing of the torsional damper arrangement.

The intermediate wall can advantageously be supported at an input hub. The support can be carried out via two sealing elements, particularly radial shaft sealing rings or rectangular sealing rings. The feed of oil into the intermediate wall can also be carried out at this location.

The actuation device can advantageously have one individual pressure space. As has already been described, the engagement of the clutches can take place via the shaping of the pressurized surfaces. A single pressure space is then sufficient, which is why the valves for controlling the pressure spaces can be dispensed with.

The torsional damper arrangement can preferably have two input hubs. As has already been described, the clutches can be uncoupled in this way.

The entire torque can advantageously be transmitted via the momentum start clutch arrangement. It will be appreciated that this is only possible when the torsional damper arrangement is installed and torque is transmitted. Consequently, the construction is such that the entire torque can be transmitted via the momentum start clutch arrangement.

The actuation arrangement of the momentum start clutch arrangement can advantageously form a part of the flywheel mass of the torsional damper arrangement. Accordingly, as has been described, the storable rotational energy can be increased. This results, for example, when the intermediate wall of the primary side of the torsional damper arrangement is connected and the actuation arrangement is formed in the intermediate wall.

The primary side of the torsional damper arrangement can preferably be supported on an input hub of the momentum start clutch arrangement. The primary side forms a part of the housing of the torsional damper arrangement so that installation space is economized in axial direction.

The dog clutch can advantageously be constructed as a radial dog clutch. This means that the teeth of the dog clutch face in radial direction.

At least one clutch of the momentum start clutch arrangement can preferably be constructed as a normally open clutch. Both clutches of the momentum start clutch arrangement can preferably be constructed as normally open clutches. This is advantageous when the motor vehicle is started via the electric motor and, accordingly, the internal combustion engine does not deliver any torque when the motor vehicle is started. Specifically, there is also no actuation pressure available for opening the clutches. Therefore, an additional pump device can be avoided.

In addition, the invention is directed to a motor vehicle with a torsional damper arrangement. The motor vehicle is characterized in that the torsional damper arrangement is constructed as described.

BRIEF DESCRIPTION OF THE DRAWINGS

Further advantages, features and particulars of the invention will be apparent from the following description of embodiment examples and figures. The drawings show.

DETAILED DESCRIPTION OF THE PRESENTLY PREFERRED EMBODIMENTS

Figure 1:
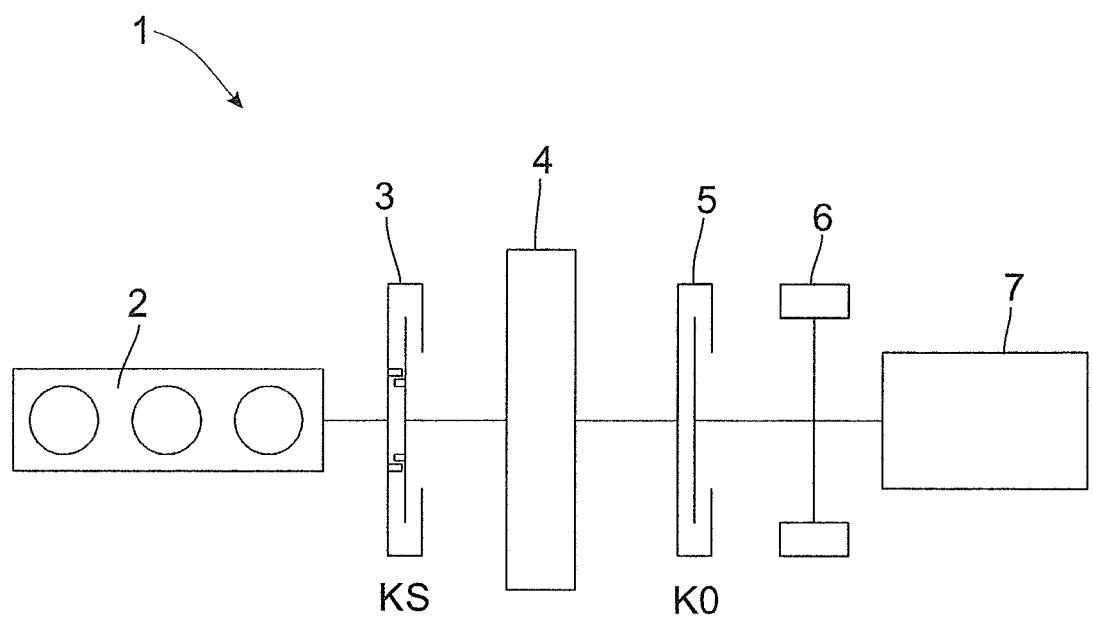
FIG. 1 is a powertrain.

FIG. 1 shows a powertrain 1 with an internal combustion engine 2, a momentum start clutch arrangement 3, a flywheel mass device 4, a disconnect clutch 5, an electric motor 6, and a transmission 7. Electric motor 6 can be configured as an individual electric motor or as electric motors connected in series. It is essential here that electric motor 6 engages powertrain 1 upstream of the transmission 7.

The momentum start clutch arrangement 3 is distinguished by its position upstream of the flywheel mass device 4. This has to do with the particular function of the momentum start clutch arrangement 3, which serves merely to start the internal combustion engine 2 and otherwise transmits the torque of the internal combustion engine 2. By providing the momentum start clutch arrangement 3, it is possible to configure the electric motor 6 with lower power reserves, which facilitates production. The momentum start clutch arrangement 3 disconnects the internal combustion engine 2 from the rest of the powertrain during all-electronic operation. Accordingly, the electric motor 6 also drives the flywheel mass device 4 as energy accumulator during all-electric motor operation. However, the added power that must be provided by the electric motor 6 for this purpose in all-electric motor operation is less than the power reserve that would be necessary if the electric motor 6 had to accelerate not only the internal combustion engine but also the flywheel mass device 4 in order to start the internal combustion engine.

Accordingly, viewed on the whole, slightly more power must be provided during operation of the electric motor 6 in order to keep the flywheel mass device 4 running. In return, however, the electric motor 6 can be designed less robustly overall because the energy stored in the flywheel mass device 4 can then be utilized for starting the internal combustion engine 2.

The momentum start clutch arrangement 3 is notably not a start-up clutch because it is not used to set the motor vehicle in motion. Regardless of whether or not the motor vehicle is already in motion, the momentum start clutch arrangement 3 merely serves to start the internal combustion engine 2. Therefore, in terms of design, it is configurable differently than a start-up clutch, for example, with respect to the dissipation of heat. To this extent, the different function is notable, for example, for the amount of pressure plate material.

Figure 2:
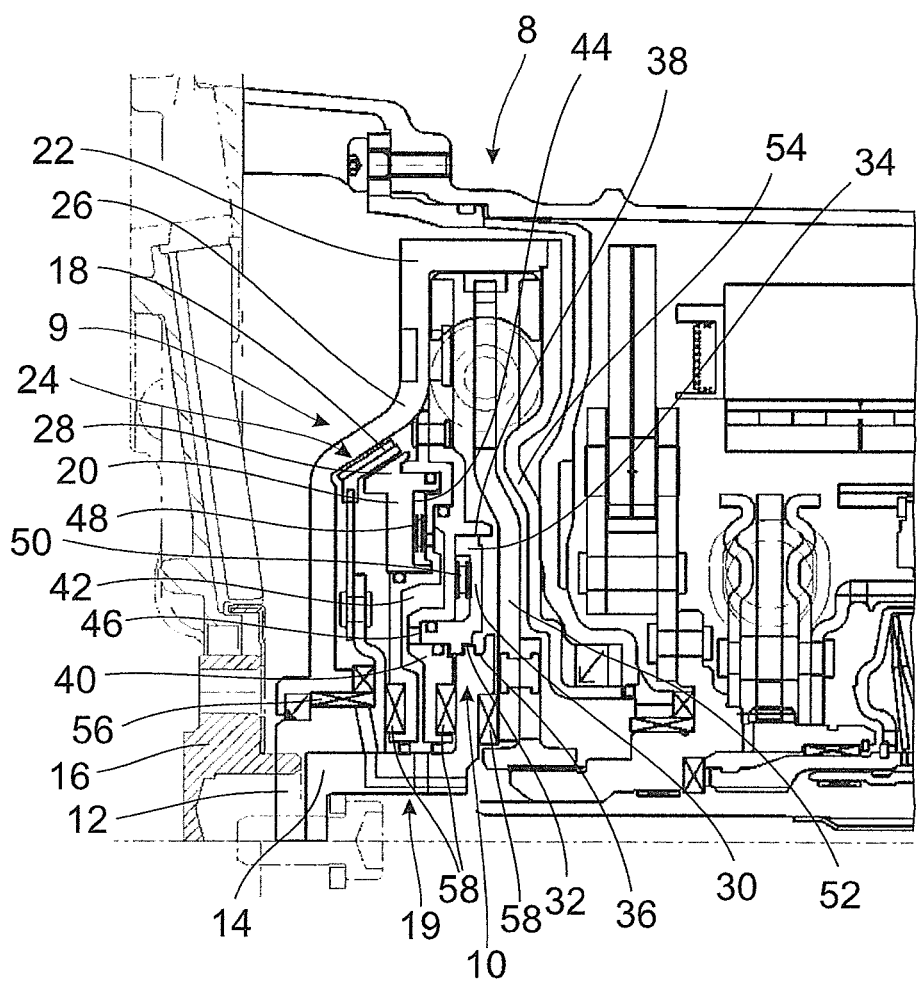
FIG. 2 is a torsional damper arrangement in a first embodiment.

FIG. 2 shows a torsional damper arrangement 8 as flywheel mass device 4. The momentum start clutch arrangement 3 is arranged inside of the torsional damper arrangement 8 and accordingly also inside of the flywheel mass device 4.

The momentum start clutch arrangement 3 comprises a friction clutch 9 and dog clutch 10. As a result of the construction which will be described in more detail presently, most parts of the momentum start clutch arrangement 3 also form a part of the flywheel mass device 4; that is, this construction comprises the torsional damper arrangement 8 and parts of the momentum start clutch arrangement 3.

Starting on the input side of the momentum start clutch arrangement 3, two input hubs 12 and 14 are found in the construction according to FIG. 2. The torque can be divided through the input hubs 12 and 14 and the dog clutch 10 can accordingly be protected against torque changes. As is shown in FIG. 2, the input hubs 12 and 14 can be screwed to the crankshaft 16 but can also be connected in positive engagement with the crankshaft via a Hirth coupling. As a further alternative, input hubs 12 and 14 can be connected to the crankshaft via a plate arrangement. The crankshaft can be screwed to a first plate and the latter is connected to a second plate which is in turn connected to the two input hubs. This results in an axially elastic connection between crankshaft and input hubs 12 and 14.

A lamina is connected as friction element 18 to the input hub 12. This lamina is fastened to a hub shield of the input hub 12. The input side of the friction clutch 9 accordingly comprises input hub 12 with hub shield and the lamina 18.

The torsional damper arrangement 8 has an actuation device 19 for actuating the friction clutch 9 and the dog clutch 10.

In addition to the actuation piston 20, the output side of the friction clutch 9 also has the housing part 22 as part of the actuation device 19. The housing part 22 is simultaneously the primary part of the torsional damper arrangement 8. The friction surface 24 at the housing part 22 can advantageously be arranged in the inclined portion, particularly at a bevel 26.

To economize on component parts, the actuation piston 20 comprises a friction cone 28 which is likewise arranged on the output side. The friction clutch 9 is accordingly formed as a single-disk friction clutch, wherein the clutch disk is formed as a lamina and the output-side mating frictional surfaces are formed at the actuation piston 20 on one hand and at the housing part 22 on the other hand. Accordingly, the output side of the friction clutch 9 is realized exclusively by component parts which are already provided at the torsional damper or via the actuation.

The input hub 14 forms the input of the dog clutch 10. The actuation piston 30 also constitutes the dog element of the dog clutch 10. The dog clutch 10 is formed as a radial dog clutch, for which reason the teeth 32 and 34 are formed in radial direction. The opposing teeth 36 and 38 are located on the input hub 14 and on the output hub at the intermediate wall 40. Intermediate wall 40 supports the actuation pistons 20 and 30 and, in so doing, is connected to housing part 22.

In addition, a portion of the feed line 42 leads through the intermediate wall 40, and the two pistons 20 and 30 can be actuated by the individual feed line 42. The pressurized surfaces 44 and 46 are selected depending on the preloading elements 48 and 50 so that the engagement of the dog clutch 10 can be carried out, for example, during a defined engagement state of the friction clutch 9. For this, the actuation surface 44 of friction clutch 9 is larger and, for example, the force of the preloading element 48 is smaller so that the friction clutch 9 is engaged first. Only during a defined engagement state of the friction clutch 9 is the force of the preloading element 50 overcome such that the dog clutch 10 is also engaged. Preloading elements 48 and 50 are preferably formed as tension springs so that friction clutch 9 and dog clutch 10 are formed as normally open clutches.

In the depicted configuration, the intermediate wall 40 and the actuation pistons 20 and 30 form a part of the flywheel mass device 4. Accordingly, they belong to the mass that stores the rotational energy and which is kept in rotation via the electric motor 6, while the internal combustion engine is uncoupled.

Only the input hubs 12 and 14 and the friction element 18 are connected to the crankshaft 16 and, accordingly, to the internal combustion engine 2. Therefore, only these parts are not part of the flywheel mass device 4.

On the secondary side, the torsional damper arrangement 8 has a secondary element 52 which also forms the output of the torsional damper arrangement 8. This secondary element 52 is surrounded by housing part 54, which is connected to housing part 22. Housing part 22 is supported on the input hub 12 by a bearing 56. Further thrust bearings 58 separate the intermediate wall 40 from the input hubs 12 and 14.

Housing parts 22 and 54 surround a wet space. The torsional damper arrangement 8 and the friction clutch 9 and dog clutch 10 are formed to be wet.

A centrifugal force pendulum is arranged at the output of the torsional damper arrangement 8. Also, a second torsional damper arrangement is arranged upstream of the disconnect clutch 5. The latter are accordingly arranged between the flywheel mass device 4 and the disconnect clutch 5 in the schematic diagram according to FIG. 1.

Figure 3:
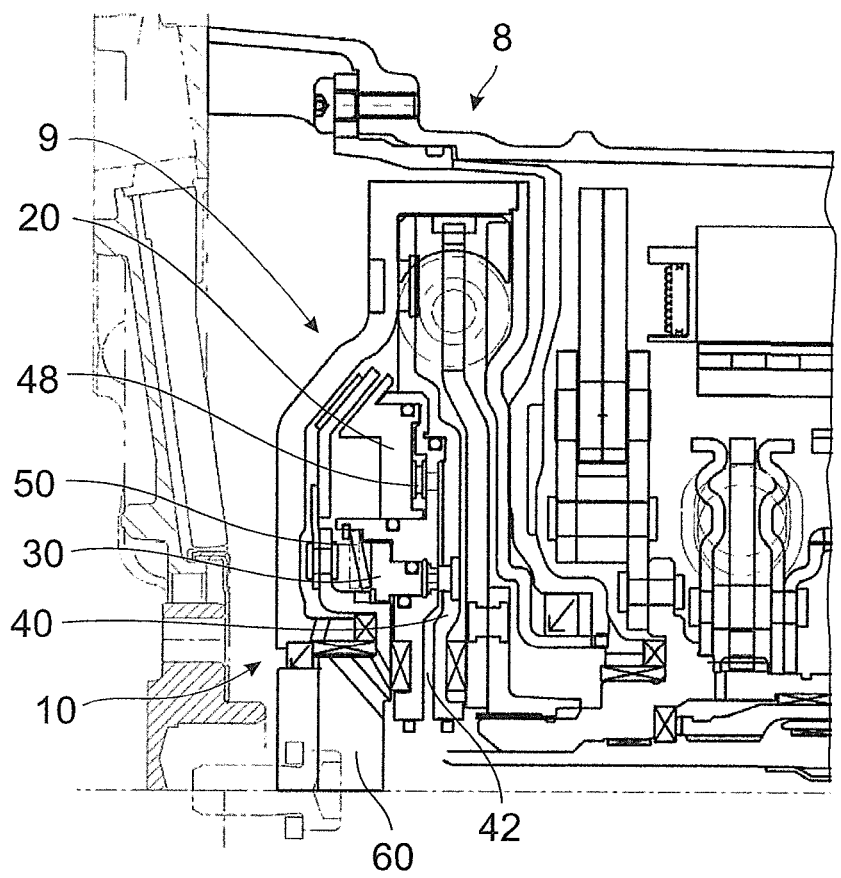
FIG. 3 is a torsional damper arrangement in a second embodiment.

FIG. 3 shows a further configuration of the torsional damper arrangement 8. In contrast to FIG. 2, actuation pistons 20 and 30 are arranged on the same side of the intermediate wall 40, for which reason there is also only one individual input hub 16. However, intermediate wall 40 is further connected to the housing part 22 and, therefore, to the primary side. A portion of the friction clutch 9 is also formed by housing part 22 and by actuation piston 20 as has already been described referring to FIG. 2.

Apart from the arrangement of actuation pistons 20 and 30 on the same side and the reduced teeth of the input hubs, the constructions shown in FIG. 2 are also applicable to FIG. 3 in other respects. Like reference numerals designate identically functioning component parts.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional damper arrangement for a motor vehicle comprising:
    a housing, wherein the housing is configured to enclose a wet space; and
    a momentum start clutch arrangement arranged in the housing,
    wherein a part of the housing of the torsional damper arrangement inclined at a bevel and is configured as a friction surface of a friction clutch of the momentum start clutch arrangement,
    wherein the momentum start clutch arrangement comprises an actuation device with at least two actuation pistons,
    wherein the actuation device of the momentum start clutch arrangement forms a part of a flywheel mass of the torsional damper arrangement.

2. The torsional damper arrangement according to claim 1, wherein the momentum start clutch arrangement comprises a friction clutch and a dog clutch.

3. The torsional damper arrangement according to claim 1, wherein a dog element of a dog clutch is formed at one of the at least two actuation pistons.

4. The torsional damper arrangement according to claim 1, wherein a friction surface of a friction clutch is formed at one of the at least two actuation pistons.

5. The torsional damper arrangement according to claim 1, wherein the actuation device has an individual feed line.

6. The torsional damper arrangement according to claim 1, wherein the at least two actuation pistons are supported at an intermediate wall in the torsional damper arrangement.

7. The torsional damper arrangement according to claim 6, wherein the at least two actuation pistons are arranged on a same side of the intermediate wall of the torsional damper arrangement.

8. The torsional damper arrangement according to claim 6, wherein the intermediate wall is connected to a primary side of the torsional damper arrangement.

9. The torsional damper arrangement according to claim 8, wherein the primary side of the torsional damper arrangement is supported on an input hub of the momentum start clutch arrangement.

10. The torsional damper arrangement according to claim 1, wherein respective pressurized surfaces of the at least two actuation pistons have a predetermined ratio selected depending on at least one preloading element.

11. The torsional damper arrangement according to claim 1, wherein the actuation device has an individual pressure space.

12. The torsional damper arrangement according to claim 1, wherein the torsional damper arrangement has two input hubs.

13. The torsional damper arrangement according to claim 1, wherein the torsional damper arrangement has exactly one input hub.

14. The torsional damper arrangement according to claim 1, wherein an entire torque is transmittable via the momentum start clutch arrangement.

15. The torsional damper arrangement according to claim 1, wherein a friction element of a friction clutch of the momentum start clutch arrangement is connected to an input hub of the torsional damper arrangement so as to be fixed with respect to rotation relative to the an input hub.

16. The torsional damper arrangement according to claim 15, wherein the friction element is formed as a friction lamina.

17. A torsional damper arrangement for a motor vehicle comprising:
    a housing, wherein the housing is configured to enclose a wet space; and
    a momentum start clutch arrangement arranged in the housing, wherein the momentum start clutch arrangement comprises an actuation device with at least two actuation pistons, wherein the at least two actuation pistons are supported at an intermediate wall in the torsional damper arrangement, and wherein the at least two actuation pistons are arranged on opposite sides of the intermediate wall.

18. A motor vehicle comprising:

a torsional damper arrangement, comprising:

a housing, that encloses a wet space; and a momentum start clutch arrangement arranged in the housing wherein the momentum start clutch arrangement comprises an actuation device with at least two actuation pistons, wherein the at least two actuation pistons are supported at an intermediate wall in the torsional damper arrangement, and wherein the at least two actuation pistons are arranged on opposite sides of the intermediate wall.

\* \* \* \* \*